United States Patent
Willmann et al.

(10) Patent No.: US 9,969,376 B2
(45) Date of Patent: May 15, 2018

(54) BRAKE BOOSTER DEVICE FOR A BRAKING SYSTEM OF A VEHICLE AND A MANUFACTURING METHOD FOR A BRAKE BOOSTER DEVICE FOR A BRAKING SYSTEM OF A VEHICLE

(71) Applicant: Robert Bosch GmbH, Stuttgart (DE)

(72) Inventors: Karl-Heinz Willmann, Freiberg (DE); Jochen Mayer, Giengen an der Brenz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 423 days.

(21) Appl. No.: 14/442,338

(22) PCT Filed: Sep. 17, 2013

(86) PCT No.: PCT/EP2013/069252
§ 371 (c)(1),
(2) Date: May 12, 2015

(87) PCT Pub. No.: WO2014/072103
PCT Pub. Date: May 15, 2014

(65) Prior Publication Data
US 2016/0251009 A1   Sep. 1, 2016

(30) Foreign Application Priority Data

Nov. 12, 2012  (DE) .................. 10 2012 220 553

(51) Int. Cl.
*B60T 13/74*   (2006.01)
(52) U.S. Cl.
CPC .......... *B60T 13/743* (2013.01); *B60T 13/745* (2013.01)

(58) Field of Classification Search
CPC ........................... B60T 15/575; B60T 15/745
See application file for complete search history.

(56) References Cited

U.S. PATENT DOCUMENTS

| 5,819,633 A | 10/1998 | Satoh |
| 5,893,316 A | 4/1999 | Inoue et al. |

(Continued)

FOREIGN PATENT DOCUMENTS

| DE | 10327553 | 1/2005 |
| DE | 102008064394 | 7/2009 |

(Continued)

OTHER PUBLICATIONS

International Search Report for PCT/EP2013/069252, dated Dec. 20, 2013.

*Primary Examiner* — F. Daniel Lopez
(74) *Attorney, Agent, or Firm* — Norton Rose Fulbright US LLP; Gerard Messina

(57) ABSTRACT

A brake booster device is provided for a braking system of a vehicle having an input rod component, which may be situated relative to a brake actuation element in such a way that the input rod component is adjustable with the aid of a driver brake force exerted on the brake actuation element, and having a guide body with a bore formed therein, into which the input rod component at least partially protrudes, an initial spring being compressibly arranged between an inner wall of the bore in the guide body and a widened intermediate section of the input rod component, and the initial spring being constrained with the aid of a captive spring mount.

12 Claims, 4 Drawing Sheets

(56) References Cited

U.S. PATENT DOCUMENTS 6,634,724 B2 * 10/2003 Kobayashi ............ B60T 8/3265
                                              188/1.11 E
2012/0073286 A1 * 3/2012 Takayama ............. B60T 13/745
                                              60/538

FOREIGN PATENT DOCUMENTS

| FR | 2860474        | 4/2005 |
| JP | H10-194110 A   | 7/1998 |
| JP | 2001-206216 A  | 7/2001 |
| JP | 2008-081-033 A | 4/2008 |

* cited by examiner

BRAKE BOOSTER DEVICE FOR A BRAKING SYSTEM OF A VEHICLE AND A MANUFACTURING METHOD FOR A BRAKE BOOSTER DEVICE FOR A BRAKING SYSTEM OF A VEHICLE

FIELD OF THE INVENTION

The present invention relates to a brake booster device for a braking system of a vehicle. The present invention also relates to a braking system for a vehicle. Furthermore, the present invention relates to a manufacturing method for a brake booster device for a braking system of a vehicle.

BACKGROUND INFORMATION

An electromechanical brake booster is described in German Published Patent Application No. 103 27 553. The electromechanical brake booster includes a piston rod as an input rod component, which is adjustable with the aid of a driver brake force exerted on a brake pedal. The piston rod extends through a bore in a guide body designed as a boost body. The guide body may be adjusted with the aid of a motor and a gear unit in such a way that a boosting force is transmittable to an actuator formed on the piston rod. In this way, the user of the electromechanical brake booster should be relieved regarding the exertion of force during braking of his/her vehicle.

SUMMARY

The present invention provides a brake booster device for a braking system of a vehicle, a braking system for a vehicle, and a method for manufacturing a brake booster device for a braking system of a vehicle.

By equipping the brake booster device with the initial spring, it is possible to ensure an advantageous/standard brake actuation feeling (pedal feeling) for a driver. By constraining the initial spring with the aid of the captive spring mount, it is also effectuated that the initial spring already possesses an advantageous pre-stressing in its captive state, even while the brake actuation element is in an unactuated state. This eliminates the conventional need of a pre-stressing of the initial spring with the aid of a spring/return spring counteracting a braking into the main brake cylinder. Since, in the present invention, this task of the spring/return spring is eliminated, it is possible to install a weaker spring/return spring in the brake booster device/in a brake booster. In one particularly advantageous specific embodiment, the spring/return spring may also be dispensed with. In the case of the brake booster device implementable with the aid of the present invention, therefore, lower brake forces (initial forces) alone are sufficient for building up a brake pressure in a main brake cylinder linked to the brake booster device.

For example, the captive spring mount may include at least one compressible bracket part. The captive spring mount may therefore be cost-efficiently designed.

In one advantageous specific embodiment, the captive spring mount includes a spring housing made up of at least one first housing part and one second housing part, the first housing part being at least partially movable into the second housing part. Such a captive spring mount ensures a reliable pre-stressing of the initial spring, even when no driver brake force is exerted on it.

In one advantageous refinement, the brake booster device, in addition to the existing initial spring constrained with the aid of the captive spring mount, includes an auxiliary spring, with the aid of which the widened intermediate section of the input rod component is supported by the inner wall of the bore in the guide body. Such an auxiliary spring reliably ensures a displacement of the input rod component in relation to the guide body, so that an interruption/termination of the actuation of the brake actuation element (for example, a release of the brake pedal) is reliably detectable. A termination of the actuation of the brake actuation element therefore effectuates the input rod component to move in relation to the guide body. Thus, the driver senses an immediate response of the brake actuation element (for example, a recoil, once he/she has terminated/interrupted its actuation.

For example, the auxiliary spring may be situated in line with the initial spring. This is easily implementable by situating the auxiliary spring in a recess formed in the widened intermediate section of the input rod component. The auxiliary spring situated in this way ensures the function thereof described in the preceding paragraph.

As an alternative, the auxiliary spring may also be situated in parallel to the initial spring. The auxiliary spring being situated in this way also reliably ensures the function thereof explained above.

In one advantageous specific embodiment, the brake booster device includes a motor connected via at least one gear component to the guide body, the guide body being adjustable with the aid of a booster force applied by the motor. Thus, the advantageous brake booster device may be designed, in particular, as an electromechanical brake booster. It is noted, however, that the brake booster device described herein is not limited to a design as an electromechanical brake booster.

In another advantageous specific embodiment, the brake booster device includes an output rod component, to which the driver brake force and/or the booster force is at least partially transmittable, and which may be situated relative to a main brake cylinder in such a way that at least one piston of the main brake cylinder is adjustable with the aid of at least one portion of the driver brake force and/or the booster force. Thus, the booster force, advantageously together with the driver brake force, may be transmitted to the at least one adjustable piston of the main brake cylinder, whereby the driver may be relieved regarding the exertion of force for braking his/her motor vehicle during an actuation of the brake actuation element.

In another advantageous refinement, the brake booster device includes a first return spring, which is situated between an inner wall of a housing of the brake booster device and a displaceable inner wall component of the brake booster device, having an opening formed therein, through which the output rod component protrudes, the brake booster device also including a second return spring, which is situated between a widened section of the output rod component and the inner wall component. In this way as well, it is possible to ensure low initial forces, which are to be exerted for building up a brake pressure in the attached brake booster.

The advantages described in the preceding paragraphs are also ensured in a correspondingly designed braking system for a vehicle.

Moreover, the advantages explained above are also implementable by carrying out a corresponding manufacturing method for a brake booster device for a braking system of a vehicle. A refinement of the manufacturing method corre-

DETAILED DESCRIPTION

Figure 1:
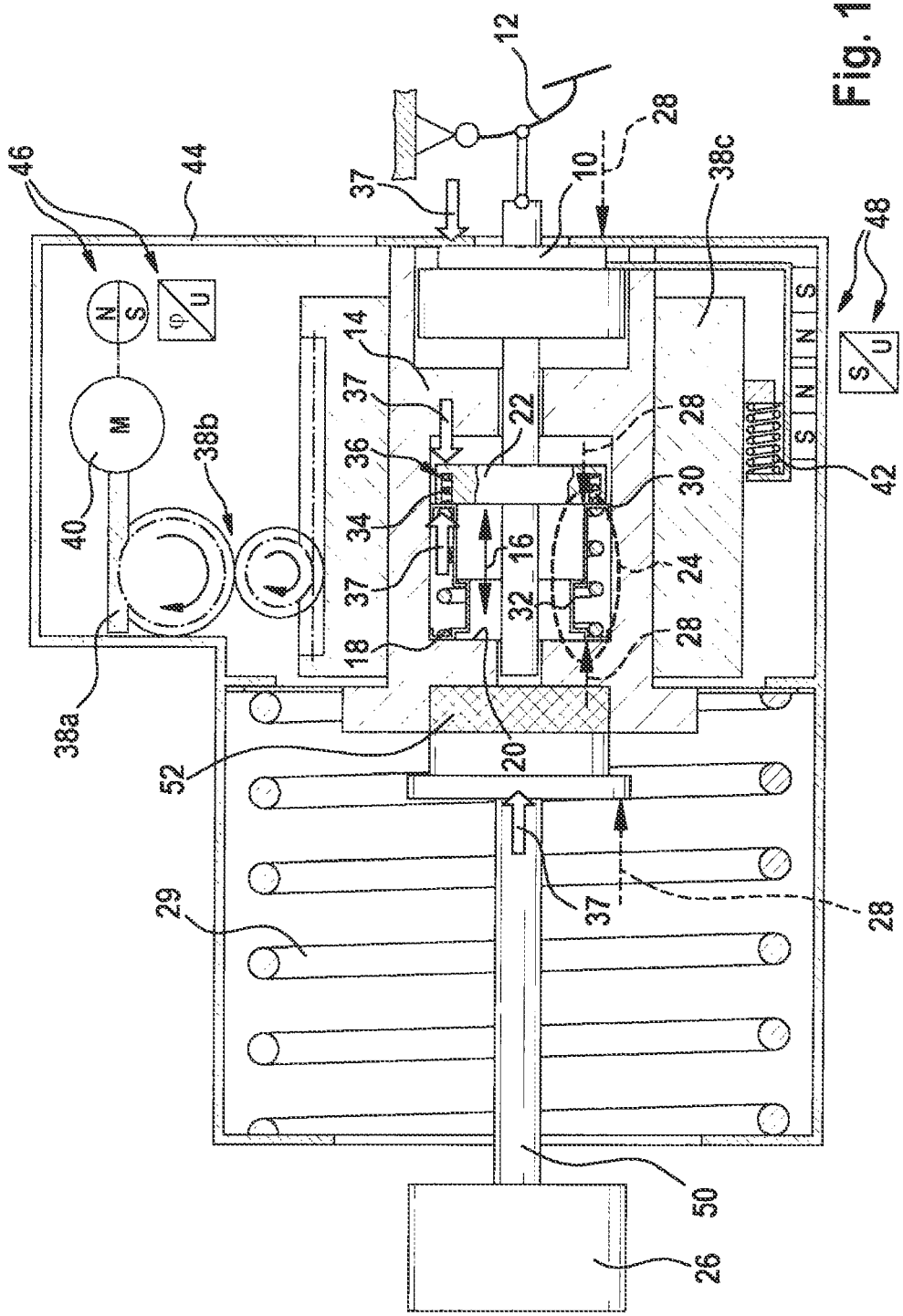
FIG. 1 shows a schematic representation of a first specific embodiment of the brake booster device.

FIG. 1 shows a schematic representation of a first specific embodiment of the brake booster device.

The brake booster device for a braking system of a vehicle schematically depicted in FIG. 1 includes an input rod component 10, which may be situated/is situated relative to a brake actuation element 12 in such a way that input rod component 10 is adjustable with the aid of a driver brake force exerted on brake actuation element 12. Input rod component 10 may be an input rod, for example. It is noted, however, that input rod component 10 is not limited to a particular outer shape, such as, for example, to a rod-shaped design. As brake actuation element 12, input rod component 10 may interact with a brake pedal, for example. However, other specific embodiments of a brake actuation element 12 may also be used together with the brake booster device.

The brake booster device also includes a guide body 14 with a bore 16 formed therein. Guide body 14 may be a boost body, for example. Input rod component 10 protrudes at least partially into bore 16 formed in guide body 14. An initial spring 18 (cut-in spring) is compressibly situated between an inner wall 20 of bore 16 in guide body 14 and a widened intermediate section 22 of input rod component 10. This may also be understood to mean that widened intermediate section 22 is supported with the aid of initial spring 18 (cut-in spring) by inner wall 20 of bore 16. Widened intermediate section 22 may be advantageously situated in a widening center section of bore 16, so that widened intermediate section 22 is prevented from sliding out with the aid of two narrower end sections of the bore. Inner wall 20 is situated preferably on a lower section of guide body 14 directed away from brake actuation element 12. Inner wall 20 may be oriented, in particular, toward brake actuation element 12.

Initial spring 18 is constrained with the aid of a captive spring mount 24 in such a way that an expansion of initial spring 18 from a partially compressed state of initial spring 18 is prevented with the aid of captive spring mount 24. This may also be described in such a way that captive spring mount 24 establishes a partially compressed state of initial spring 18, which allows a further compression of initial spring 18, out of which, however, initial spring 18 is unable to expand. Thus, captive spring mount 24 causes a pre-stressing of initial spring 18 in its captive state.

It is expressly noted that captive spring mount 24 is understood to mean at least one additional component, which is situated between inner wall 20 of bore 16 and widened intermediate section 22 of input rod component 10. Thus, captive spring mount 24 is not understood to mean a locking of inner wall 20 at a maximum distance from widened intermediate section 22.

By constraining initial spring 18 with the aid of captive spring mount 24, it is possible to effectuate a suitable pre-stressing of the initial spring, without initial spring 18 being pre-stressed with the aid of a spring/return spring. Normally, the pre-stressing of initial spring 18 is frequently effectuated with the aid of a spring/return spring supported on a main brake cylinder 26. Dashed arrows 28 plotted in FIG. 1 show the conventional force flow of the spring/return spring (not plotted), which effectuates the pre-stressing of initial spring 18 according to the related art. In the case of conventional brake boosters, comparatively high spring constants for the respective spring/return spring are present to ensure a sufficient pre-stressing of initial spring 18. A pre-stressing of the respective spring/return spring should generally be, in particular, at least as high as a pre-stressing of initial spring 18, so that initial spring 18 (at the rear stop) is pre-stressed accordingly.

In contrast, in the case of the brake booster device described herein, it is possible to dispense with a pre-stressing of initial spring 18 with the aid of a spring/return spring counteracting the braking movement of input rod component 10. Thus, for the brake booster device described herein, at most only one spring/return spring having a comparatively low spring constant counteracting the braking movement of input rod component 10 is needed. Thus, it is ensured that the braking movement of input rod component 10 is not counteracted by any high spring forces of the respective spring/return spring. The minimum force to be exerted for braking into main brake cylinder 26 is therefore reduced by constraining initial spring 18 with the aid of captive spring mount 24. Thus, the brake booster device described herein enables a braking into main brake cylinder 26 after overcoming a low impedance threshold/force threshold. This is advantageous, in particular, if the driver wishes to build up a brake force in main brake cylinder 26 quickly and with the aid of a comparatively low force.

In some specific embodiments of the brake booster device it is, in particular, possible to dispense with equipping the brake booster device with a spring/return spring counteracting the braking movement of input rod component 10. This is the case, for example, in the specific embodiment of FIG. 1. The brake booster device of FIG. 1 includes only one booster mechanism—return spring 29, with the aid of which guide body 14 adjusted in the way described below from its initial position, is readjustable back into this position. As is apparent based on FIG. 1, booster mechanism—return spring 29 counteracts only a movement of guide body 14 from its initial position, but not a movement of input rod component 10 relative to guide body 14. Thus, input rod component 10 is adjustable relative to guide body 14 by a difference path, which is not equal to zero, without the need for a force to be exerted on booster mechanism—return spring 29. Preferably, only guide body 14 is supported in the brake booster device by a wall situated close to main brake cylinder 26 with the aid of booster mechanism—return spring 29.

The advantageous adjustability of input rod component 10 (relative to guide body 14) without a compression of a normally required spring/return spring for pre-stressing initial spring 18 enables a braking into main brake cylinder 26 with the aid of a comparatively small force to be exerted on input rod component 10. The specific embodiment of FIG. 1 makes it significantly easier for a driver to build up pressure in main brake cylinder 26 as compared to conventional brake boosters.

In the specific embodiment of FIG. 1, captive spring mount 24 includes a spring housing made up of at least one first housing part 30 and one second housing part 32, first housing part 30 being at least partially movable into second housing part 32. Housing parts 30 and 32 may also be described as telescoping bracket parts. It is noted that housing parts 30 and 32 need not be designed in such a way that they completely surround initial spring 18. Instead, housing parts 30 and 32 may also be designed as telescoping bracket parts. In addition, captive spring mount 24 may also include at least one compressible bracket part. The advantageous function of captive spring mount 24, which contributes to reducing the force to be exerted for braking into main brake cylinder 26, is not limited to a particular design of captive spring mount 24.

The brake booster device of FIG. 1, in addition to existing initial springs 18 constrained with the aid of captive spring mount 24, also includes an auxiliary spring 34, with the aid of which the widened intermediate section 22 of input rod component 10 is supported by inner wall 20 of bore 16 in guide body 14. Auxiliary spring 34 essentially effectuates a displacement of input rod component 10 relative to guide body 14 in such a way that an interruption/termination of an actuation of brake actuation element 12 such as, for example, a releasing of a brake pedal, is reliably detectable. A pre-stressing of auxiliary spring 34 may be much less than a pre-stressing of initial spring 18. Auxiliary spring 34 may be pre-stressed, in particular, with the aid of main brake cylinder 26, as depicted by arrows 37. A spring for pre-stressing auxiliary spring 34 is therefore not required. In addition, auxiliary spring 34 has virtually no effect/no effect on a spring constant of a spring/return spring potentially present and counteracting the braking movement of input rod component 10. Thus, auxiliary spring 34 triggers no increase in the minimum force to be exerted on input rod component 10 for braking into main brake cylinder 26. The specific embodiment of FIG. 1, therefore, has an optimized spring arrangement resulting from the constraining of initial spring 18 and the additional use of auxiliary spring 34.

Main brake cylinder 26 may be a tandem main brake cylinder, for example. However, the brake booster device is not limited to an interaction with a main brake cylinder 26 designed as a tandem main brake cylinder.

In the specific embodiment of FIG. 1, auxiliary spring 34 is situated in line with initial spring 18. This may be understood to mean that a first end of auxiliary spring 34 contacts initial spring 18, whereas a second end of auxiliary spring 34 abuts a surface of widened intermediate section 22 of input rod component 10.

In this case, for example, auxiliary spring 34 is situated in a recess 36 formed in widened intermediate section 22 of input rod component 10. Thus, it is possible to equip the brake booster device with auxiliary spring 34 without the need for enlarging and/or expanding the installation space of the brake booster device.

The brake booster device includes as an expansion a motor 40 connected to guide body 14 via at least one gear component 38*a* through 38*c*, guide body 14 being movable from its (powerless) initial position with the aid of a booster force applied by motor 40. The brake booster device may therefore be designed as an electromechanical brake booster.

The readjustment of guide body 14 moved from its initial position with the aid of motor 40 may take place with the aid of an optional, separate spring 42. However, separate spring 42 has no effect on the minimal force/initial force to be exerted for braking into main brake cylinder 26 following a failure of motor 40, since the driver is able to move input rod component 10 in relation to guide body 14 without compressing separate spring 42.

Due to the advantageous design of the brake booster device, which allows the low minimal forces/initial forces for braking into main brake cylinder 26 explained above, the driver is still able to brake into main brake cylinder 26 with the aid of a comparatively minimal driver brake force, even in the event of a failure of motor 40. If, in the specific embodiment depicted, motor 40 fails, the driver need only overcome the spring forces of springs (not shown) in main brake cylinder 26 for braking into main brake cylinder 26. Auxiliary spring 34 and constrained initial spring 18 are connected in series with the springs in main brake cylinder 26, and do not increase the brake force/initial force to be exerted after a failure of motor 40. This makes braking into main brake cylinder 26 significantly easier after a failure of motor 40. Thus, the brake booster device of FIG. 1, designed as an electromechanical brake booster, has an advantageous backup mode.

As an option, at least one sensor 46 and 48 may also be installed in a housing 44 (exterior housing) of the brake booster device. For example, a (magnetic) rotation angle sensor 46 for ascertaining/checking the functionality of motor 40 may be present in housing 44. A (magnetic) path sensor 48, in particular, a rod path sensor 48, for ascertaining/checking an adjustment path of input rod component 10, an adjustment path of guide body 14 and/or a difference path between input rod component 10 and guide body 14, may also be installed in housing 44. Equipping the brake booster device with the at least one sensor 46 and 48 is optional, however.

Furthermore, the brake booster device may also include an output rod component 50, to which the driver brake force and/or the booster force is/are at least partially transmittable. Output rod component 50, an output rod, for example, is preferably attachable/attached relative to main brake cylinder 26 in such a way that at least one piston of main brake cylinder 26 is adjustable with the aid of at least one portion of the driver brake force and/or the booster force. The driver brake force and/or the booster force may be at least partially transmittable to output rod component 50 via a reaction disk 52, which is situated preferably in an opening in guide body 14 on a side oriented toward main brake cylinder 26. Thus, a reaction disk 52 may be used for the advantageous brake booster device.

Figure 2:
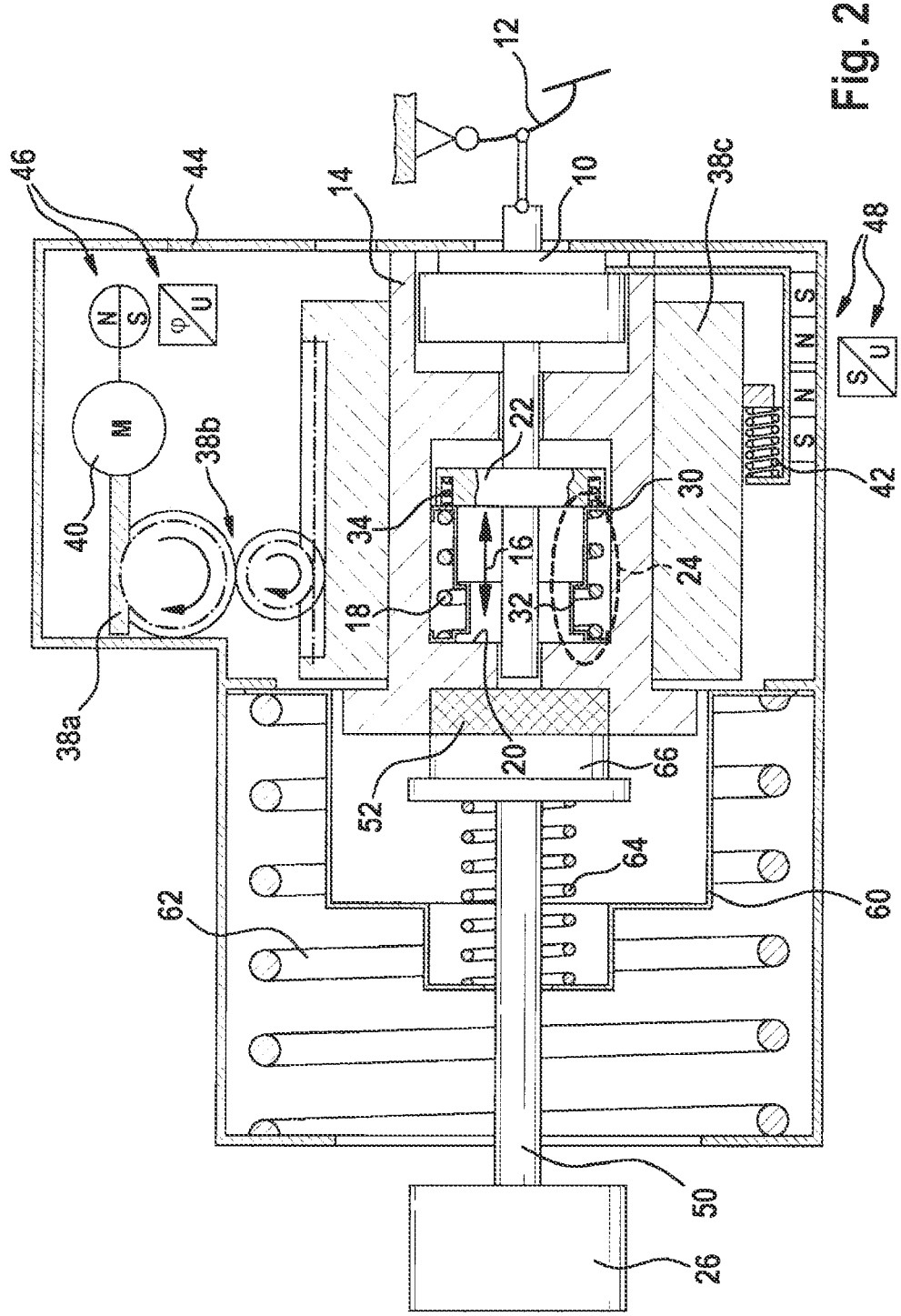
FIG. 2 shows a schematic representation of a second specific embodiment of the brake booster device.

FIG. 2 shows a schematic representation of a second specific embodiment of the brake booster device.

The brake booster device schematically depicted in FIG. 2 includes, as an addition to the specific embodiment described above, a displaceable inner wall component 60, in which an opening is formed, through which output rod component 50 protrudes. A first return spring 62 of the brake booster device is situated between an inner wall of a housing 44 of the brake booster device and the displaceable inner wall component 60. (Displaceable inner wall 60 is supported in this case preferably by the inner wall of housing 44 situated close to main brake cylinder 26 via first return spring 62). In addition, the brake booster device also includes a second return spring 64, which is situated between a widened section/end section 66 of output rod component 50 and inner wall component 60. This may also be understood to mean that widened section/end section 66 of output rod component 50 is supported by displaceable inner wall component 60 via second return spring 64. Widened section/end section 66 of output rod component 50 is preferably pointed away from main brake cylinder 26, whereas second return spring 64 is situated on a side of displaceable inner wall component 60 pointed away from main brake cylinder 26.

Inner wall component 60 is displaceably designed in such a way that it is adjustable simultaneously with an adjusting movement of guide body 14. Due to the opening formed in inner wall component 60, however, a braking movement of input rod component 10 and/or output rod component 50 does not effectuate a simultaneous adjustment of inner wall component 60. Thus, first return spring 62 merely counteracts the adjusting movement of guide body 14. The spring constant of first return spring 62, therefore, has no effect on a minimal force to be exerted for braking into the main brake cylinder after a failure of motor 40.

Second return spring 64 has a comparatively small spring constant. Thus, it is optimized with respect to the pre-stressing. Since, after a failure of motor 40, only second return spring 64 counteracts a braking into main brake cylinder 26, a brake pressure buildup in main brake cylinder 26 in the back-up mode with the aid of a comparatively small brake force is thus also possible in the case of the brake booster device of FIG. 2.

Figure 3:
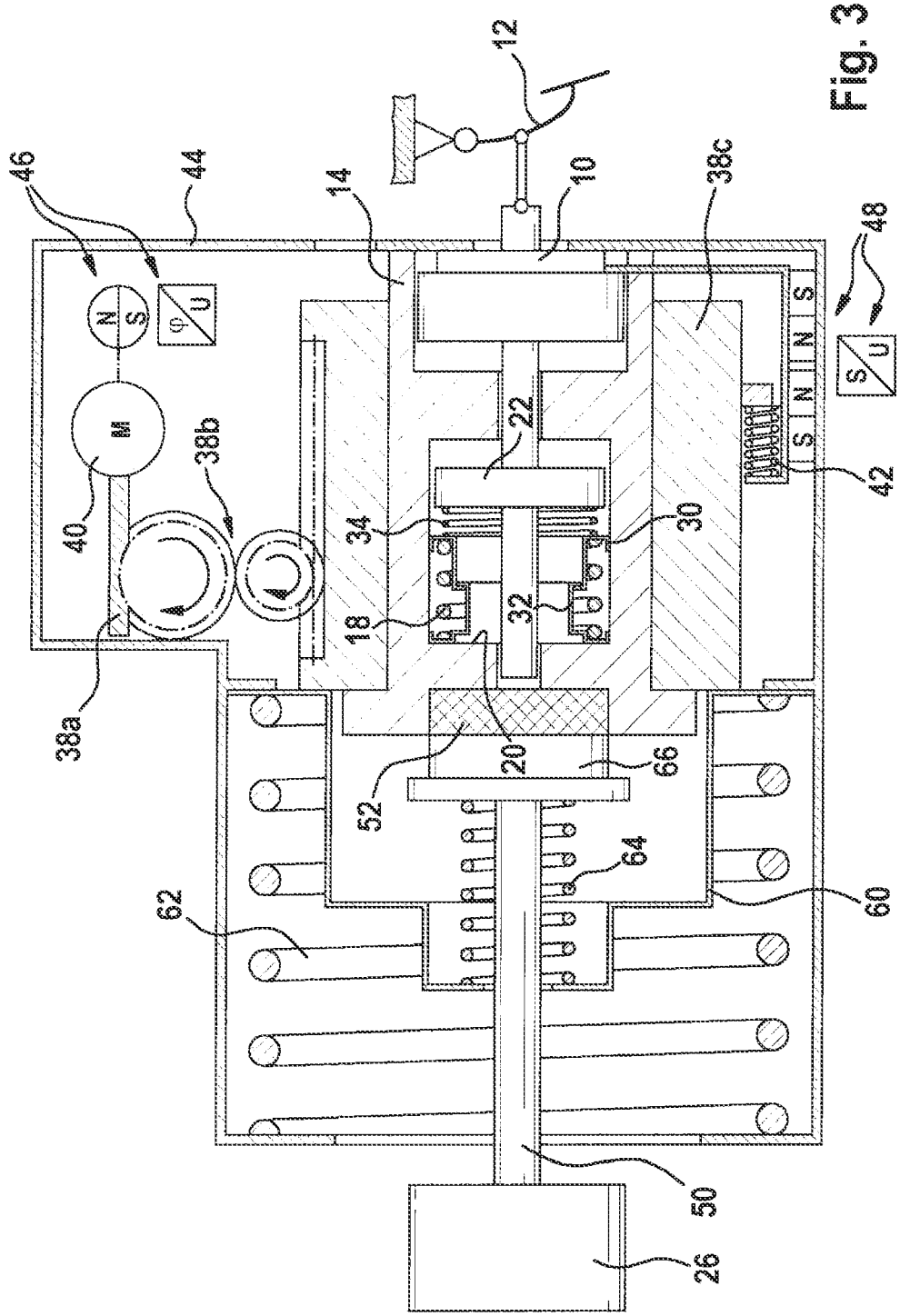
FIG. 3 shows a schematic representation of a third specific embodiment of the brake booster device.

FIG. 3 shows a schematic representation of a third specific embodiment of the brake booster device.

In contrast to the specific embodiment explained above, auxiliary spring 34 in the case of the brake booster device of FIG. 3 is mounted outside of input rod component 10. Nevertheless, auxiliary spring 34 is still in line with constrained initial spring 18. This may also be described in such a way that a first end of auxiliary spring 34 contacts initial spring 18, whereas a second end of auxiliary spring 34 abuts an outer side of widened intermediate section 22 of input rod component 10.

Figure 4:
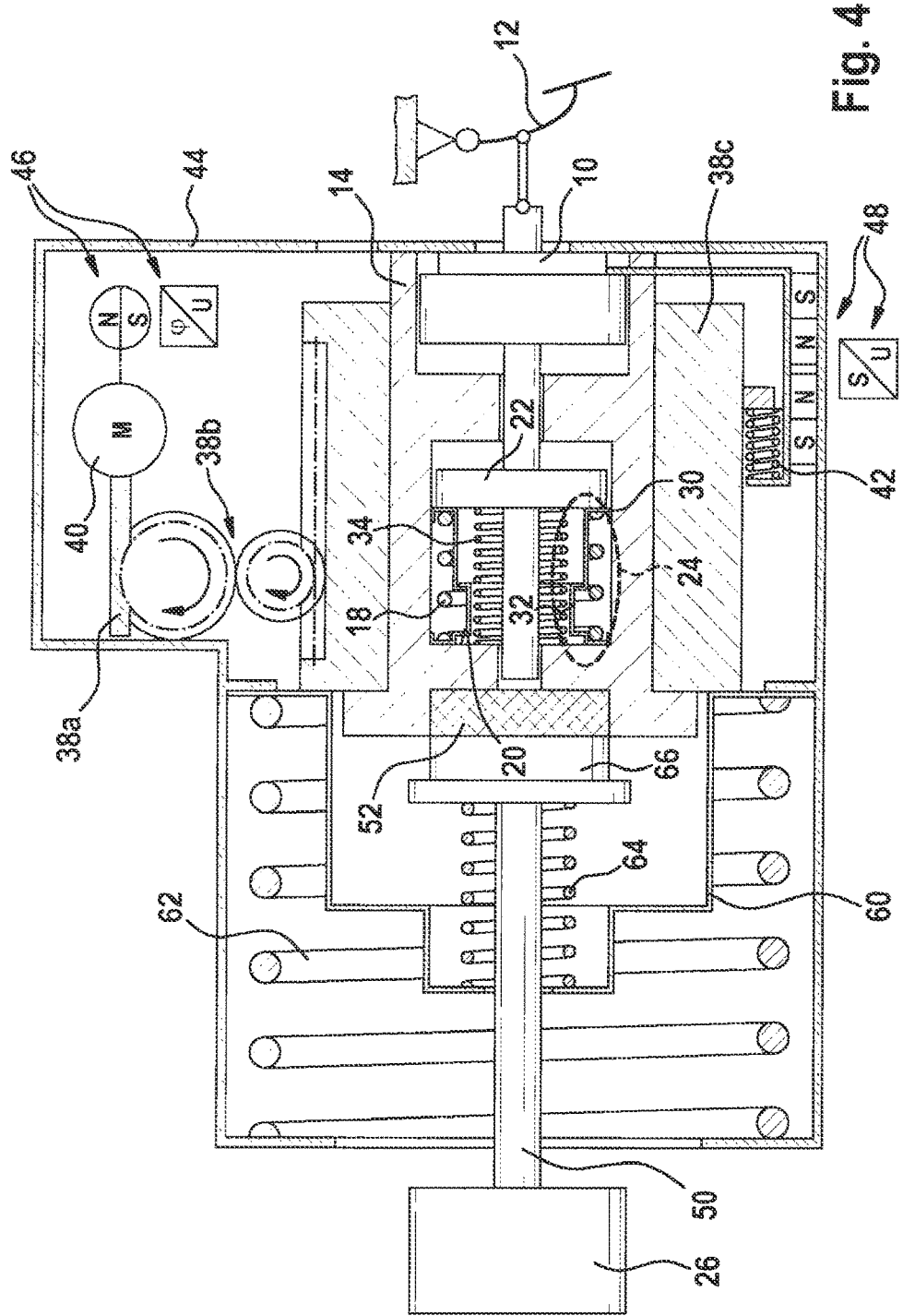
FIG. 4 shows a schematic representation of a fourth specific embodiment of the brake booster device.

FIG. 4 shows a schematic representation a fourth specific embodiment of the brake booster device.

In the brake booster device schematically depicted in FIG. 4, auxiliary spring 34 is situated in parallel to initial spring 18. This may be understood to mean that a first end of auxiliary spring 34 contacts inner wall 20 of bore 16 in guide body 14, whereas a second end of auxiliary spring 34 abuts an outer surface of widened intermediate section 22 of input rod component 10. In particular, auxiliary spring 34 may be situated in a volume spanned by (constrained) initial spring 18. Thus, the designability of the brake booster device is not limited to a configuration of auxiliary spring 34 in line with constrained initial spring 18.

It is noted, however, that second return spring 64 in the specific embodiments of FIGS. 2 through 4 is merely optional. Once the spring forces of main brake cylinder 26 are sufficient to pre-stress auxiliary spring 34, second return spring 64 may be completely dispensed with.

All brake booster devices described above may be manufactured by carrying out a manufacturing method for a brake booster device for a braking system of a vehicle. However, the feasibility of the manufacturing method is not limited to the brake booster devices described above.

In the manufacturing method, an input rod component 10, which is adjusted with the aid of a driver brake force exerted on a brake actuation element 12 during an operation of the brake booster device, is situated at least partially in a bore 16 of a guide body 14. In this case, an initial spring 18 is compressibly mounted between an inner wall 20 of bore 16 in guide body 14 and a widened intermediate section 22 of input rod component 10, initial spring 18 being constrained with the aid of a captive spring mount 24 between inner wall 20 of bore 16 and widened intermediate section 22 of input rod component 10 in such a way that an expansion of initial spring 18 from a partially compressed state of initial spring 18 is prevented by captive spring mount 24. Examples of input rod component 10, brake actuation element 12, guide body 14, initial spring 18 and captive spring mount 24 have been described above. Hence a pictorial representation of the manufacturing method is dispensed with.

What is claimed is:

1. A brake booster device for a braking system of a vehicle, comprising:
    an input rod component that is attachable to a brake actuation element in such a way that the input rod component is adjustable with the aid of a driver brake force exerted on the brake actuation element;
    a guide body having a bore formed therein and into which the input rod component at least partially protrudes;
    an initial spring that is compressibly mounted between an inner wall of the bore in the guide body and a widened intermediate section of the input rod component; and
    a captive spring mount, with the aid of which the initial spring is constrained in such a way that an expansion of the initial spring from a partially compressed state of the initial spring is prevented with the aid of the captive spring mount;
    an auxiliary spring, with the aid of which the widened intermediate section of the input rod component is supported by the inner wall of the bore in the guide body;
    wherein the auxiliary spring is situated in line with the initial spring; and
    wherein the auxiliary spring is situated in a recess formed in the widened intermediate section of the input rod component.

2. The brake booster device as recited in claim 1, wherein the captive spring mount is formed from a spring housing that includes at least a first housing part and a second housing part, and wherein the first housing part is at least partially movable into the second housing part.

3. The brake booster device as recited in claim 1, further comprising:
    at least one gear component; and
    a motor connected via the at least one gear component to the guide body, wherein the guide body is adjustable with the aid of a booster force applied by the motor.

4. A brake booster device for a braking system of a vehicle, comprising:
    an input rod component that is attachable to a brake actuation element in such a way that the input rod component is adjustable with the aid of a driver brake force exerted on the brake actuation element;
    a guide body having a bore formed therein and into which the input rod component at least partially protrudes;
    an initial spring that is compressibly mounted between an inner wall of the bore in the guide body and a widened intermediate section of the input rod component;
    a captive spring mount, with the aid of which the initial spring is constrained in such a way that an expansion of the initial spring from a partially compressed state of the initial spring is prevented with the aid of the captive spring mount;
    at least one gear component;
    a motor connected via the at least one gear component to the guide body, wherein the guide body is adjustable with the aid of a booster force applied by the motor;
    a first return spring situated between an inner wall of a housing of the brake booster device and a displaceable inner wall component of the brake booster device, the housing having an opening formed through which an output rod component protrudes; and
    a second return spring situated between a widened section of the output rod component and the inner wall component.

5. The brake booster device as recited in claim 4, further comprising:
an auxiliary spring, with the aid of which the widened intermediate section of the input rod component is supported by the inner wall of the bore in the guide body.

6. The brake booster device as recited in claim 5, wherein the auxiliary spring is situated in line with the initial spring.

7. The brake booster device as recited in claim 5, wherein the auxiliary spring is situated in parallel to the initial spring.

8. The brake booster device as recited in claim 7, wherein at least one of the driver brake force and the booster force is at least partially transmittable to the output rod component, and wherein the output rod component is attachable to a main brake cylinder in such a way that at least one piston of the main brake cylinder is adjustable with the aid of at least one portion of at least one of the driver brake force and the booster force.

9. A manufacturing method for a brake booster device for a braking system of a vehicle, comprising:
arranging an input rod component, which is adjusted with the aid of a driver brake force exerted on a brake actuation element during an operation of the brake booster force, at least partially in a bore of a guide body;
compressibly arranging an initial spring between an inner wall of the bore in the guide body and a widened intermediate section of the input rod component, the initial spring being constrained with the aid of a captive spring mount between the inner wall of the bore and the widened intermediate section of the input rod component in such a way that an expansion of the initial spring from a partially compressed state of the initial spring is prevented by the captive spring mount;
arranging a first return spring between an inner wall of a housing of the brake booster device and a displaceable inner wall component of the brake booster device, the housing having an opening formed through which an output rod component protrudes; and
arranging a second return spring between a widened section of the output rod component and the inner wall component.

10. A manufacturing method for a brake booster device for a braking system of a vehicle, comprising:
arranging an input rod component, which is adjusted with the aid of a driver brake force exerted on a brake actuation element during an operation of the brake booster force, at least partially in a bore of a guide body;
compressibly arranging an initial spring between an inner wall of the bore in the guide body and a widened intermediate section of the input rod component, the initial spring being constrained with the aid of a captive spring mount between the inner wall of the bore and the widened intermediate section of the input rod component in such a way that an expansion of the initial spring from a partially compressed state of the initial spring is prevented by the captive spring mount;
arranging an auxiliary spring in a recess formed in the widened intermediate section of the input rod component, the widened intermediate section of the input rod component is supported by the inner wall of the bore in the guide body using the auxiliary spring;
wherein the auxiliary spring is situated in line with the initial spring.

11. A brake booster device for a braking system of a vehicle, comprising:
an input rod component that is attachable to a brake actuation element in such a way that the input rod component is adjustable with the aid of a driver brake force exerted on the brake actuation element;
a guide body having a bore formed therein and into which the input rod component at least partially protrudes;
an initial spring that is compressibly mounted between an inner wall of the bore in the guide body and a widened intermediate section of the input rod component; and
a captive spring mount, with the aid of which the initial spring is constrained in such a way that an expansion of the initial spring from a partially compressed state of the initial spring is prevented with the aid of the captive spring mount;
an output rod component, to which at least one of the driver brake force and the booster force at least partially transmittable, wherein the output rod component is attachable to a main brake cylinder in such a way that at least one piston of the main brake cylinder is adjustable with the aid of at least one portion of at least one of the driver brake force and the booster force;
a first return spring situated between an inner wall of a housing of the brake booster device and a displaceable inner wall component of the brake booster device, the housing having an opening formed through which the output rod component protrudes; and
a second return spring situated between a widened section of the output rod component and the inner wall component.

12. The brake booster device as recited in claim 11, wherein the widened section of the output rod component is supported, with the aid of the first return spring, by the inner wall of the housing of the brake booster device.

* * * * *